Figure 1:
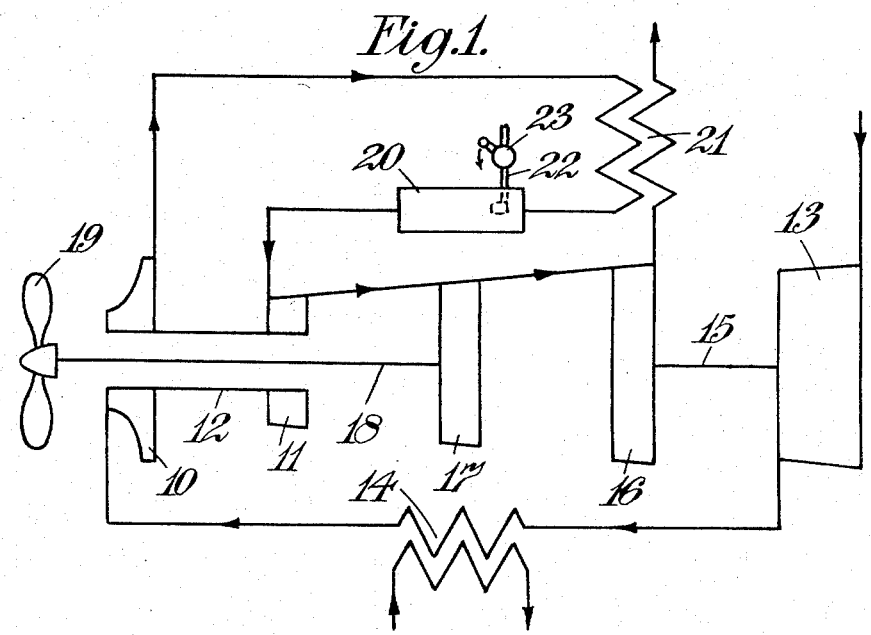

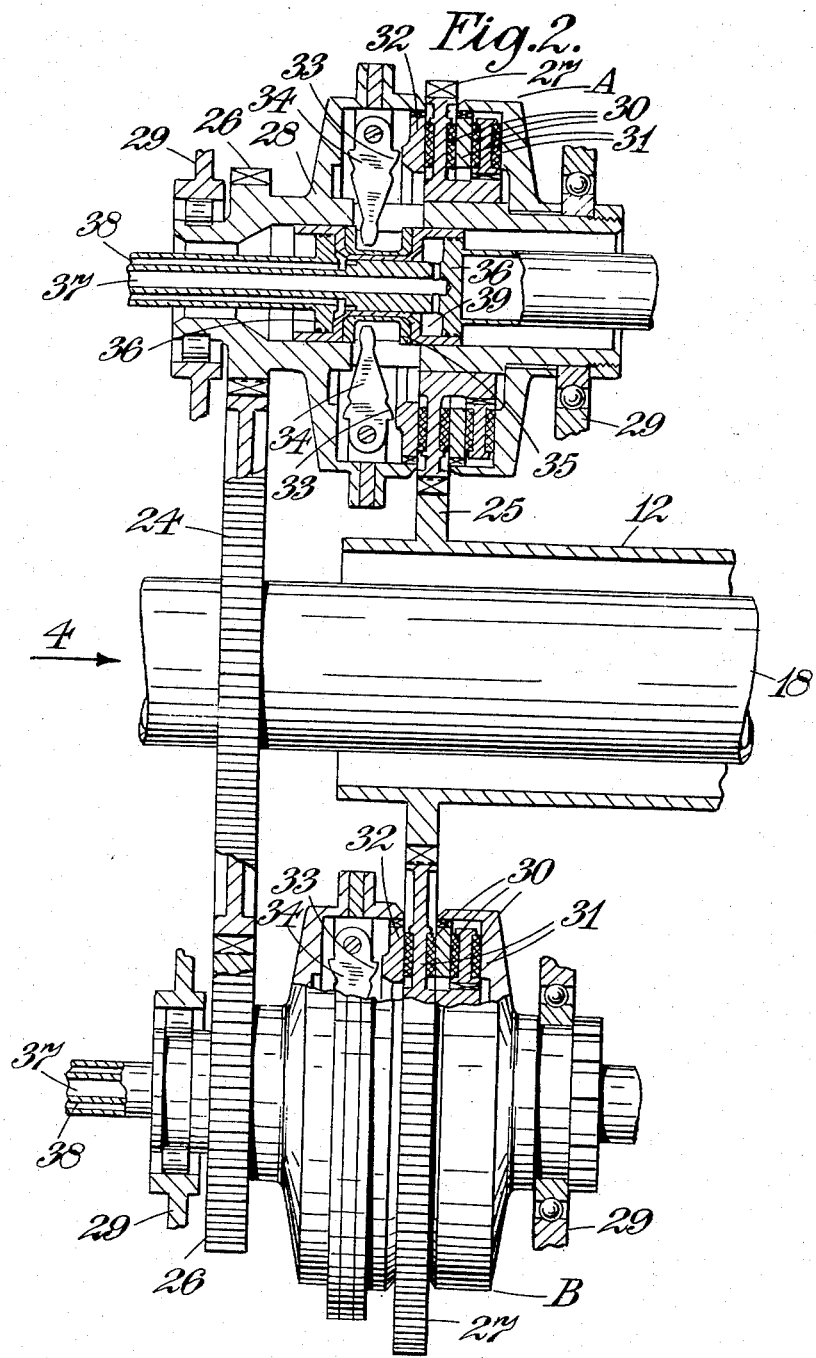

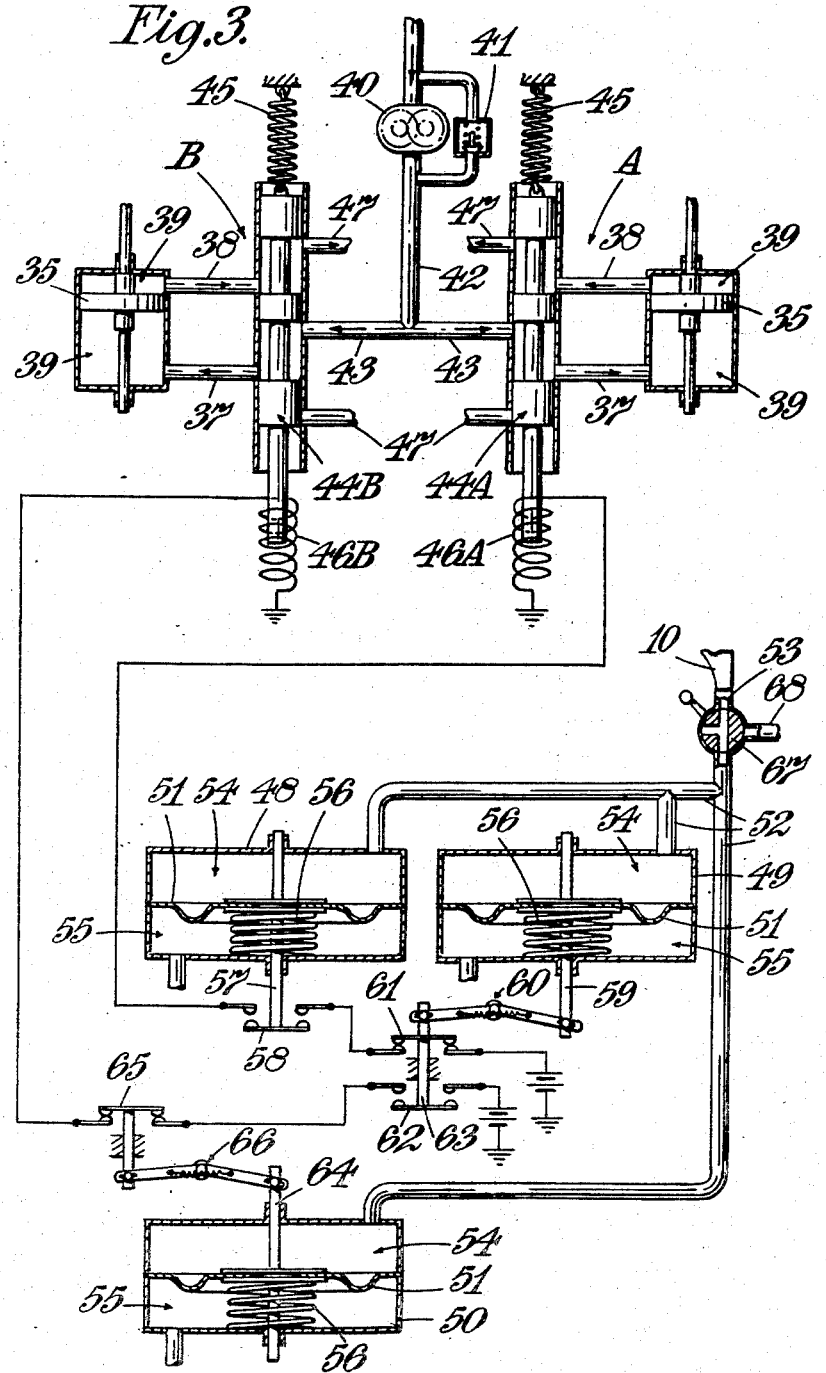

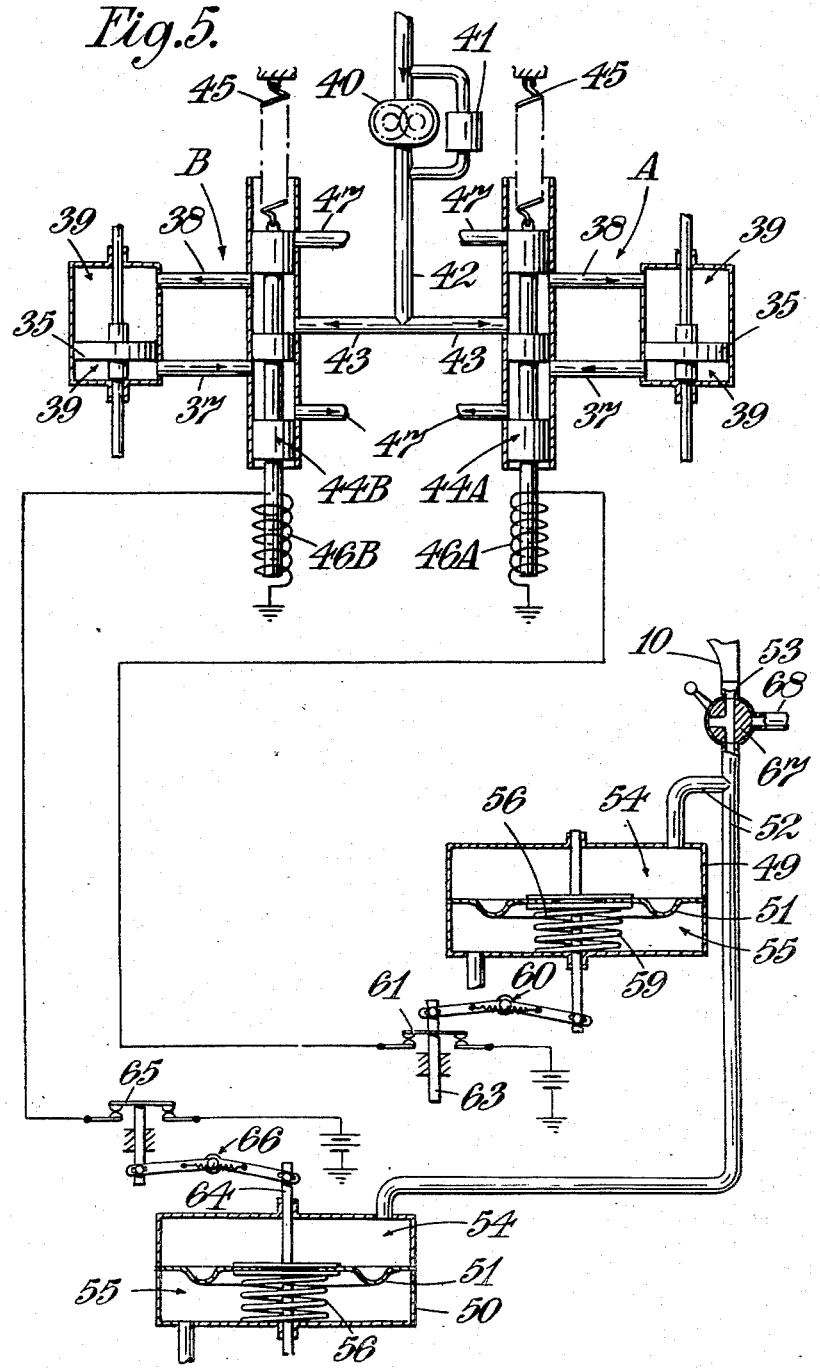

United States Patent Office 2,802,334
Patented Aug. 13, 1957

2,802,334

GAS TURBINE ENGINES

Arthur Holmes Fletcher, Derby, and Robert William Corbitt, Sittingbourne, England, and William Spencer Knowles, deceased, late of Sunny Hill, Derby, England, by Joyce Winifred Knowles and Thomas Roskelly Grimsdick, administrators, Norwich, England, assignors to Rolls-Royce Limited, Derby, England, a British company Application January 13, 1953, Serial No. 330,956

Claims priority, application Great Britain January 14, 1952

11 Claims. (Cl. 60—39.16)

This invention relates to gas-turbine engines. The invention is more particularly concerned with gas-turbine engines of the kind (hereinafter referred to as the kind specified) including an air compressing system delivering air to combustion equipment from which the products of combustion pass to a turbine system which comprises at least a compressor-driving turbine driving a compressor of said air compressing system and a power turbine driving a power output shaft through which power is delivered to be absorbed externally of the engine, the compressor-driving turbine being arranged to rotate independently of the power turbine.

Gas turbine engines of the kind specified are commonly known in the art as open-cycle, free-power-turbine engines, and it is a characteristic of such an engine that when it is operating at a power output which is a fraction (for example less than one-half for a particular design) of the maximum power output, the thermal efficiency is low owing to a reduction in the gas inlet temperature of the turbine system.

When an engine of the kind specified is required in use to operate over a wide power range of the output shaft, the low thermal efficiencies experienced at low power outputs are a great disadvantage from the point of view of economy of operation. Thus for example in the case of an engine designed for marine or for aircraft propulsion, the range of the vessel or aircraft may be substantially reduced owing to uneconomical operation at low power outputs of the engine. Similarly in the case of gas turbine engines used for driving commercial plant such as electric generators, it is desirable to maintain a high thermal efficiency throughout an extended range of power outputs.

The object of the present invention is to improve the thermal efficiency of gas-turbine engines of the kind specified in operation at power outputs below the maximum available power output.

According to the present invention a gas-turbine engine of the kind specified is provided with means arranged to couple the power turbine and a compressor-driving turbine drivingly together when the power absorbed from the output shaft externally of the engine falls below a selected value which is less than the maximum power output of the engine thereby to permit the compressor-driving turbine to deliver power to the output shaft to be absorbed externally of the engine.

In operation of gas-turbines according to the invention, with the compressor-driving turbine coupled with the power turbine and on absorption of power from the compressor-driving turbine through the output shaft, a reduction in the speed of the compressor-driving turbine will occur and thus the mass flow through the engine will fall so that for any given rate of fuel delivery a higher turbine inlet temperature is obtained than would be the case if the turbines were not coupled. The increased inlet temperature improves the thermal efficiency of the engine, despite the fact that the reduced speed and consequent reduction in compression ratio of the compressor tends to reduce the thermal efficiency of the engine; the increase in turbine inlet gas temperature obtained with a given fuel supply more than compensates for the loss due to reduction of the compression ratio. This is particularly so where a heat exchanger is used to abstract heat from the exhaust gas of the turbine system to pre-heat air delivered by the compressor prior to delivery of the air into the combustion equipment for the combustion of fuel therewith. Thus if as is usual in say marine engines the fuel supply is not dependent on the engine rotational speed, the power output may go up on engaging the coupling means.

The coupling means will include a clutch, for instance, a mechanical or fluid clutch, and may also include gearing. Thus the turbines may be coupled together so that they run at the same speed, or gearing may be provided to give a speed ratio between the turbines of other than 1:1, and if required the gearing may provide a plurality of ratios, one to be used in each of a corresponding plurality of sub-ranges of power outputs below the maximum power output. The gearing provided is such that when it is rendered operative the speed of the compressor-driving turbine is reduced.

The coupling means may also comprise a free-wheel device arranged so that the compressor cannot be driven by, and thus absorb power from, the power turbine, i. e. the compressor is never forced to run at a rotational speed which is higher than it would have if the coupling means of the invention were not to be employed. Such forced excess rotational speed would cause a reduction in gas temperature and an overall loss in thermal efficiency.

In accordance with a further feature of the invention, the coupling means may be arranged to become operative automatically on the attainment of a pre-determined value of an engine operating variable which varies with the power output, such as a compressor delivery pressure, compressor compression ratio, turbine inlet gas temperature, or power turbine rotational speed.

The invention also includes a method of control of gas-turbine engines of the kind specified, which method includes coupling the compressor-driving turbine to the power turbine when the power absorbed from the output shaft externally of the engine falls below a selected value which is less than the maximum shaft horsepower which the engine can deliver, so that the compressor-driving turbine delivers power through the output shaft to be absorbed externally of the engine when the turbines are so coupled.

Figure 4:
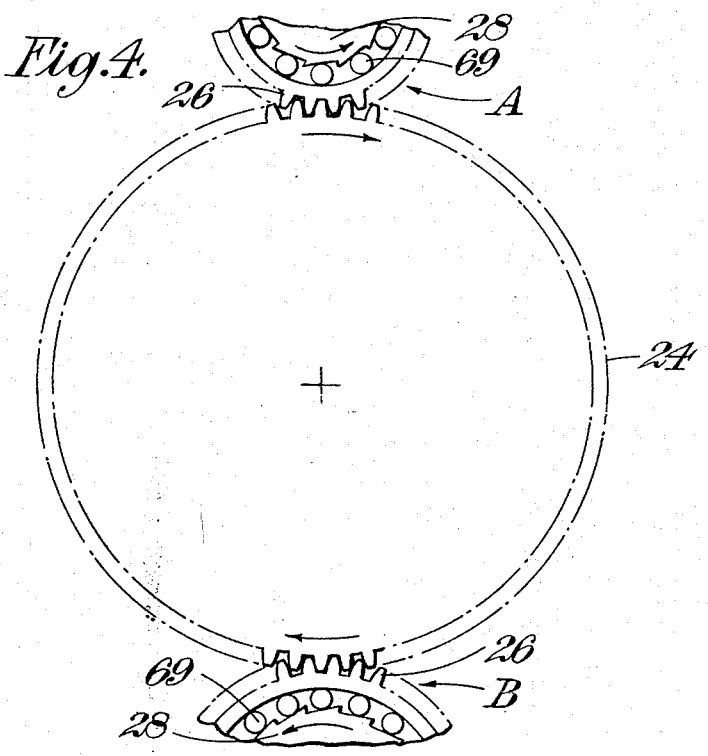

Two embodiments of coupling means for use in a gas-turbine engine arrangement of this invention will now be described with reference to the accompanying drawings in which:

Figure 1 is a diagrammatic illustration of one known form of gas-turbine engine of the kind specified, Figure 2 is a view with parts in section of one embodiment of coupling means, Figure 3 illustrates one form of control for operating the coupling means of Figure 2, Figure 4 illustrates a modification which may be applied to the coupling means of Figure 2, the view being taken in the direction of arrow 4 on Figure 2, and Figure 5 illustrates a control for use with the coupling means of Figure 2 when modified in accordance with Figure 4.

Referring to Figure 1, the known engine illustrated comprises a high-pressure unit including a high-pressure compressor 10 which is driven by a high-pressure turbine 11 through a shaft 12, a low-pressure unit including a low-pressure compressor 13 which delivers to the high-pressure compressor 10 through an intercooler 14 and to drive the low-pressure compressor 13 through a shaft 15, a low-pressure turbine 16, a power turbine 17 which drives an output shaft 18 indicated as carrying a marine propeller 19 forming the power absorbing load, and combustion equipment 20 which receives air from the high-pressure compressor 10 through a heat exchanger 21 wherein the air flows in heat exchange with exhaust gases from the low-pressure turbine 16. The combustion equipment 20 is fed with fuel through a supply pipe 22 and a throttle valve 23 is provided to control the supply of fuel and thus the power output of the engine. The power turbine 17 is in flow series between the high-pressure turbine 11 and the low-pressure turbine 16.

In normal operation of such an engine, the compressor-driving turbine 11 and the power turbine 17 rotate independently, the power turbine delivering power through the output shaft 18 to the power absorbing means indicated by the propeller 19. As the power output is reduced the rotational speed of the power turbine 17 falls more rapidly than that of the high-pressure compressor 10 and the turbine inlet temperature tends to fall.

The invention improves thermal efficiency of a power plant such as is shown in Figure 1 having independently rotatable power and compressor-driving turbines, by arranging that the turbine inlet temperature is kept nearer the permissible maximum value than with known engines throughout the power output range and for this purpose provides means to couple together the shafts 12, 18 which means is operable at selected power outputs.

Referring to Figure 2, the coupling may comprise, as shown, a gear and clutch mechanism which when operative ensures that the high-pressure compressor-driving turbine 11 and the power turbine 17 run at a predetermined speed ratio.

With the mechanism of Figure 2, the two shafts 12 and 18 may either run independently of one another, or be coupled through a mechanism A so that the shaft 12 is forced to run at a speed which is approximately twice that of the shaft 18, or be coupled through a mechanism B which is similar to the mechanism A but is such that the compressor-driving shaft 12 is forced to run at approximately three times the speed of the power turbine shaft 18.

The shaft 18 is shown as carrying a pinion 24 and the shaft 12 is shown as having a pinion 25 rotating therewith. The pinions 24, 25 mesh with corresponding pinions 26, 27 of each of the mechanisms A and B and the pinions 24, 25, 26 and 27 are selected to give the ratios mentioned above.

In each of the mechanisms A and B, the pinion 26 is rotatable with a rotating structure 28 mounted in stationary structure 29, the rotating structure 28 including a housing accommodating a friction clutch and an operating mechanism therefor.

Each friction clutch comprises friction elements 30 rotatable with the pinion 27, which friction elements cooperate with friction surfaces 31 rotatable with the structure 28 and with a pressure plate 32 which is splined in the rotating structure 28 to rotate therewith. The pressure plate is arranged to be engageable by cam surfaces 33 provided on a number of pivoted levers 34 which are pivotally mounted in the structure 28 and are disposed to extend radially towards the rotational axis of the structure 28. The inner ends of the levers 34 are engageable by a channelled piston member 35 axially slidable within the rotatable structure 28 and the axial sliding of the channelled member 35 is effected hydraulically. The channelled member 35 is formed at its ends with a pair of recesses 39 occupied by piston-like elements 36 which close-off the recesses, and pressure fluid is supplied to one or other of these recesses through ducts 37 and 38 afforded by co-axial pipes. When pressure fluid is supplied to the right-hand recess 39 through the duct 37, the friction clutch is disengaged and so the mechanism A or B is inoperative. When pressure fluid is fed to the clutch-operating mechanism through the duct 38, the channelled member 35 moves to the right as viewed in the drawing engaging the inner ends of the levers 34 and pressing the cam surfaces 33 against the pressure plate 32, thus engaging the friction clutch and drivingly interconnecting the shafts 18 and 12 through the pinions 24, 26, 27, 25.

The mechanism just described will conveniently be employed in accordance with the following table:

| Throttle setting | Ratio shaft speeds | Clutch A | Clutch B | Compressor delivery pressure |
|---|---|---|---|---|
| Full ↓ ⅔ | Variable | disengaged | disengaged | |
| | | | | —66 p. s. i. |
| ⅔ ↓ ⅓ | 2:1 | engaged | disengaged | |
| | | | | —33 p. s. i. |
| ⅓ ↓ ¼ | 3:1 | disengaged | engaged | |
| | | | | —25 p. s. i. |
| below ¼ | Variable | disengaged | disengaged | |

It will be seen that when operating in the upper power range mechanisms A and B are both inoperative, that gearing and clutch mechanism A is brought into operation to force the compressor-driving shaft 12 to run about twice the speed of the power shaft 18 when, on reducing the power output, the throttle 23 reaches the two-third throttle position, that the gearing and clutch mechanism B is brought into operation in place of the mechanism A thereby to force the shaft 12 to run at about three times the speed of shaft 18, at about one-third throttle, and that both mechanisms A and B are rendered inoperative at about quarter throttle to leave the shafts 12, 18 free to rotate independently again.

Such a mode of operation may be employed when, for example, the turbine inlet temperature falls say by 100° C. as compared with the full throttle temperature on reaching two-third throttle, when with mechanism A engaged the temperature at the turbine inlet tends at about one-third throttle to rise above the maximum permissible value due to excessive slowing down of the compressor, and when, with mechanism B engaged, the turbine inlet temperature again tends to exceed the maximum permissible value at about a quarter throttle.

Such a mechanism may be controlled in any convenient manner and one suitable control is illustrated in Figure 3. This control depends for its operation upon the delivery pressure of the high-pressure compressor 10.

Referring now to Figure 3, there is provided a servo pressure fluid supply indicated as comprising a liquid pump 40 having a by-pass from its outlet to its inlet containing a pressurising valve 41 whereby the pressure in delivery conduit 42 is maintained constant. The delivery pipe 42 branches into two pressure fluid delivery pipes 43 leading to a pair of piston valves 44A, 44B associated respectively with the mechanisms A and B of Figure 2. The piston valves 44A, 44B control the supply of pressure fluid to ducts 37, 38 for operating the friction clutches of the mechanisms A and B and the clutch-operating members 35 of Figure 2 are indicated in this figure by the same reference numerals.

Each piston valve is shown as having a loading spring 45 which tends to keep it in its uppermost position as viewed in the drawing and as being movable to its alternative position by means of a corresponding solenoid 46A, 46B.

When the solenoid 46A, or 46B is energised the associated piston valve 44A, 44B lowers so connecting the corresponding delivery pipe 43 to the associated duct 38 thereby causing the friction clutch to be engaged. When the solenoid 46A, 46B is de-energised, the spring 45 moves the piston valve 44A or 44B to the opposite end of its travel connecting the associated delivery pipe 43 to the associated duct 37 so disengaging the friction clutch.

Drain pipes 47 are provided to take the return fluid from the operating mechanisms of the friction clutches.

In order to effect the control in accordance with the foregoing table a number of pressure-responsive devices 48, 49 and 50 are provided.

Each of the pressure-responsive devices comprises a flexible diaphragm 51 dividing the device into two chambers 54, 55 the uppermost chamber 54 of which is connected through a conduit 52 to a tapping 53 from the delivery of the high-pressure compressor 10 so that each flexible diaphragm 51 is loaded at its upper surface in accordance with the compressor delivery pressure. The lower chamber 55 of each pressure-responsive device is loaded at atmospheric pressure and each chamber 55 contains a loading spring 56 for the diaphragm 51. Alternatively the chambers 55 may be evacuated.

The diaphragm 51 of the pressure-responsive device 48 is connected by an operating rod 57 to the contact member 58 of a switch in the current supply circuit to the solenoid 46A and the load applied to the diaphragm 51 by the spring 56 of this pressure responsive mechanism is arranged so that the switch 58 closes when the pressure within chamber 54 falls below the first selected value, i. e. 66 lbs. per sq. inch, in the above table.

The diaphragm 51 of the pressure-responsive device 49 has an operating rod 59 connected through a toggle mechanism 60 to operate contact members of a pair of switches 61, and 62, which contact members are carried on a common rod 63. The switch 61 is connected in the current supply circuit for the solenoid 46A and the switch 62 is connected in a current supply circuit for the solenoid 46B. It is arranged, for instance, that the spring 56 of the pressure-responsive mechanism 49 loads its diaphragm 51 with a load corresponding to a pressure within the chamber 54 of a second selected value i. e. about 33 lbs. per sq. inch in the above table, and so on reduction of pressure the switch mechanisms are operated to open the switch 61 and close the switch 62 when the pressure within the chamber 54 (that is the compressor delivery pressure) falls to a value equal to 33 lbs. per sq. inch less an amount dependent upon the load necessary to operate the toggle 60. Conversely, on increasing the pressure within the chamber 54, the switch 61 will be closed and the switch 62 opened when the pressure within chamber 54 equals 33 lbs. per sq. inch plus the amount dependent upon the load required to operate toggle 60.

The diaphragm 51 of the pressure-responsive device 50 is connected with an operating rod 64 arranged through a toggle mechanism 66 to operate the contact member of a switch 65. The spring 56 of the pressure-responsive device 50 is arranged to load this diaphragm 51 with a load equivalent to a pressure within chamber 54 of a third selected value, i. e. 25 lbs. per sq. inch in the above table, and thus, on fall of the pressure within the chamber 54, the switch 65 will be opened when the pressure within the space 54 equals 25 lbs. per sq. inch less an amount dependent upon the load required to operate the toggle mechanism 66. On increase of pressure within the space 54, the switch 65 will be closed when the pressure within the space 54 reaches a value equal to 25 lbs. per sq. inch plus the amount dependent upon the load necessary to operate toggle mechanism 66. The switch 65 is connected in series with the switch 62 in the current supply circuit for the solenoid 46B.

The toggle mechanisms 60 and 66 are provided to prevent "hunting" in operation of the power plant.

The tapping pipe 53 from the compressor delivery is provided with a valve 67 in one position of which tapped air can be delivered to the chambers 54 of the pressure-responsive devices 48, 49, 50, and in the second position of which the chambers 54 may be connected to a pipe 68 leading to atmosphere. The valve 67 thus enables the automatic control to be over-ridden.

In operation, assuming the throttle 23 to be set at full throttle, on adjustment of the throttle to reduce the power output the rotational speeds of the two shafts 12 and 18 fall, the power shaft speed falling more rapidly than the compressor-driving shaft speed and the two shafts running freely of one another. Also the turbine inlet temperature gradually falls.

When the two-thirds throttle position is reached, the switch 58 is closed energising the solenoid 46A and causing the friction clutch of the mechanism A to be engaged. Under these conditions the high-pressure compressor 10 is caused to run at a lower speed (the gear ratio afforded by mechanism A being selected to ensure this) and its turbine 11 transmits a drive into the output shaft 18; as a result the mass flow through the engine decreases and the turbine inlet temperature increases and it may be arranged that the turbine inlet temperature rises to close to the full throttle value.

On further adjustment of the throttle down to about one-third throttle, it may be found that, due to the rotational speed of the coupled shafts falling rapidly, the turbine inlet temperature has increased and reached its maximum permissible value and that therefore it is desirable to increase the mass flow through the engine. This is effected automatically at this point by the switch 61 being opened and switch 62 being closed so that solenoid 46A is de-energised allowing the clutch of mechanism A to disengage and so that solenoid 46B is energised causing the clutch of mechanism B to be engaged so allowing the compressor to speed-up as compared with its speed just before the changeover is effected, thus to increase the mass flow and decrease the turbine inlet temperature.

A further reduction in the power absorbed by the propeller due to adjustment of the throttle 23 and thus of the speed of the coupled shafts will again cause a further increase of the turbine inlet temperature and, when it reaches the maximum permissible value, the switch 65 opens causing the friction clutch of the mechanism B to be disengaged so allowing the high-pressure compressor 10 and its associated turbine 11 to again run independently of the power turbine 17. Under these circumstances the high-pressure compressor 10 will speed-up so increasing the mass flow and decreasing the turbine inlet temperature.

It is undesirable that the coupling mechanisms should at any time cause the high-pressure compressor unit 10, 11 to rotate faster than it would normally rotate. In order to prevent this happening, say due to malfunctioning of the control, the gear trains of the mechanisms A and B may each include a free-wheel by which the power turbine 17 can overrun the high-pressure compressor-driving turbine 11. This prevents power being delivered by the power turbine 17 to drive the high-pressure compressor 10.

One such arrangement is indicated in Figure 4 from which it will be seen that each of the mechanisms A and B includes a free-wheel clutch 69 between its pinion 26 and its rotating structure 28, the free wheel being arranged so that a drive can be effected from the structure 28 to the pinion 26 but no drive can be transmitted in the reverse direction.

With such an arrangement, the automatic control may be simplified as will be understood from the following table:

| Throttle setting | Friction clutch A | Free wheel A | Friction clutch B | Free wheel |
|---|---|---|---|---|
| Full ↓ ⅔ | engaged | overrunning | engaged | overrunning |
| ⅔ ↓ ⅓ | engaged | driving | engaged | overrunning |
| ⅓ ↓ ¼ | disengaged | --- | engaged | driving |
| ¼ ↓ | disengaged | --- | disengaged | --- |

A suitably simplified control is shown in Figure 5 and it will be seen that switch 58 and its associated pressure-responsive device 48, and switch 62 are omitted.

In operation, assuming the throttle to be in the full throttle position, the solenoids 46A and 46B are energised and the associated friction clutches engaged. But, since the power turbine 17 is running at more than half the speed of the compressor 10, both free-wheels 69 are over-running.

At about two-thirds throttle, the speed of power turbine 17 tends to fall below half the speed of the compressor 10 and the free-wheel of mechanism A locks and transmits a drive from shaft 12 to shaft 18 so that below this throttle setting the shaft 18 is driven at half the speed of shaft 12.

On reaching one-third throttle, the pressure-responsive device 49 opens switch 61 so de-energising solenoid 46A and rendering the mechanism A inoperative. The compressor 10 then speeds up until the free-wheel 69 of mechanism B locks to transmit a drive and thus the speeds of the compressor 10 and power turbine 17 are held in a ratio of 3:1.

On reaching quarter throttle, the pressure-responsive device 50 operates to open switch 65 deenergising solenoid 46B and rendering the mechanism B inoperative. The compressor 10 and power turbine 17 are now free to run independently of one another.

It will be seen that with both the above described arrangements, the coupling mechanism will be disengaged when starting thereby enabling the compressor-driving turbine to rotate independently of the power turbine.

If desired, the pressure-responsive devices 48, 49, and 50 may be replaced by speed-responsive devices, such as fly-ball governors, arranged to respond to the rotational speed of the power turbine to operate the switches at rotational speeds corresponding to the pressures given in the first above mentioned table. Alternatively, the devices 48, 49, 50 may be replaced by devices responsive to the turbine inlet temperature.

While the invention has been more particularly described as applied to a turbine engine suitable for marine propulsion in which the speed of the power turbine is defined by the power absorption characteristics of a marine screw, the invention may be used in engines in which the speed is otherwise defined, for example it may be applied to electrical generating equipment arranged to run at constant speed for a constant frequency alternating supply. Arrangements suitable for such application may involve the selection of a gear ratio which may provide for substantial equality of the rotational speeds of the compressor and power turbines. It will be appreciated, however, that the selection of the gear ratio is entirely dependent upon the characteristics of the particular engine design and the manner in which the power is absorbed externally of the engine.

We claim:

1. A gas-turbine engine comprising an air compressor, combustion equipment connected to said compressor to receive air therefrom and arranged to have fuel burnt in it, a compressor-driving turbine drivingly-connected to said compressor, a power turbine having a power output shaft through which power is delivered to be absorbed externally of the engine, said compressor-driving turbine and said power turbine being connected in flow series and to said combustion equipment to receive combustion products therefrom and being capable of rotating independently of one another, and releasable coupling means drivingly connected to the power turbine and to the compressor-driving turbine, said coupling means being responsive to a predetermined value of an engine operating variable which varies with the power output and being rendered operative to transmit power from the compressor-driving turbine to the power turbine when the value of said engine operating variable falls below said predetermined value.

2. A gas-turbine engine as claimed in claim 1 wherein said releasable coupling means comprises a positive clutch, and clutch-actuating means responsive to said predetermined value of the engine operating variable, said clutch-actuating means rendering said positive clutch operative to transmit power when the value of the operating variable falls below the predetermined value.

3. A gas-turbine engine as claimed in claim 2, wherein said releasable coupling means comprises also gearing connected drivingly in series with said positive clutch, said gearing having a transmission ratio to constrain the power turbine and the compressor-driving turbine, when said positive clutch is operative, to rotate at a desired speed ratio.

4. A gas-turbine engine as claimed in claim 1, wherein said releasable coupling means comprises a positive clutch capable of transmitting a drive in both directions, clutch-actuating means responsive to said predetermined value of an engine operating variable, said clutch-actuating means actuating said positive clutch to transmit power when the value of the operating variable falls below said predetermined value, and a freewheel clutch connected drivingly in series with the positive clutch, said freewheel clutch transmitting a drive from the compressor-driving turbine to the power turbine but transmitting no drive in the reverse direction.

5. A gas-turbine engine as claimed in claim 4, wherein said releasable coupling means comprises also gearing connected drivingly in series with said positive clutch and said freewheel clutch, said gearing having a transmission ratio to constrain the power turbine and the compressor-driving turbine, when said coupling means is operative, to rotate at a desired speed ratio.

6. A gas-turbine engine as claimed in claim 1, wherein said releasable coupling means comprises a plurality of positive clutches capable of transmitting a drive in both directions, each of said positive clutches having associated clutch-actuating means which is responsive to a predetermined value of an engine operating variable and actuates the clutch to transmit power when the value of the operating variable falls below the predetermined value, the predetermined value to which each clutch-actuating means responds being different from the predetermined value for each other clutch-actuating means, and each of said positive clutches having drivingly in series therewith an associated freewheel clutch which transmits a drive from the compressor-driving turbine to the power turbine but transmits no drive in the reverse direction, and each of said positive clutches further having associated gearing connected drivingly in series therewith, the gearing associated with each positive clutch having a different transmission ratio from that associated with each other positive clutch, whereby on engagement of one positive clutch a drive is transmitted from the compressor-driving turbine to the power turbine at one ratio of speeds, and whereby on engagement of a second positive clutch a drive is transmitted from the compressor-driving turbine to the power turbine at a second ratio of speeds.

7. A gas-turbine engine comprising an air compressor, combustion equipment connected to said compressor to receive air compressed therein and arranged to have fuel burnt in it, a compressor-driving turbine drivingly connected to said compressor, a power turbine having a power output shaft through which power is delivered to be absorbed externally of the engine, said compressor-driving turbine and said power turbine being connected in flow series and being connected to said combustion equipment to receive combustion products therefrom and said turbines being arranged to be capable of rotating independently of one another, and releasable coupling means responsive to predetermined values of an engine operating variable which varies with the power output, said coupling means comprising a first driving connection interconnecting said turbines, and a second driving connection interconnecting said turbines, said first driving connection comprising a first gear train having a first transmission ratio and first clutch means drivingly in series with said first gear train, and said second driving connection comprising a second gear train having a second transmission ratio which is different from said first transmission ratio, and second clutch means drivingly in series with said second gear train, and said coupling means also comprising first means responsive to said operating variable and operative to engage said first clutch means to transmit power when the value of the operating variable falls below a first predetermined value which is less than the value of the operating variable at the maximum power of the engine, and second means responsive to said operating variable and operative when the value of the operating variable falls below a second predetermined value which is less than said first predetermined value, to disengage said first clutch means and to engage said second clutch means.

8. A gas-turbine engine as claimed in claim 7, comprising also third means responsive to said operating variable and operative to disengage said second clutch means when the value of the operating variable falls below a third predetermined value which is less than said second predetermined value.

9. A gas-turbine engine as claimed in claim 8, wherein said first means responsive to the variable includes a first pressure-responsive device connected to respond to the delivery pressure of said air compressor and operative at a first compressor delivery pressure to render said first clutch means operative to transmit a drive, wherein said second means responsive to the operating variable comprises a second pressure-responsive device responsive to said compressor delivery pressure and operative at a second value of said pressure which is below said first value to render said first clutch means inoperative and to render said second clutch means operative to transmit a drive, and wherein said third means responsive to the operating variable comprises a third pressure-responsive device responsive to said compressor delivery pressure and operative at a third value of said delivery pressure which is below said second value of said delivery pressure, to render said second clutch means inoperative.

10. A gas-turbine engine comprising an air compressor, combustion equipment connected to said compressor to receive air therefrom and arranged to have fuel burnt in it, a compressor-driving turbine connected to drive said compressor, a power turbine having a power output shaft through which power is delivered to be absorbed externally of the engine, said compressor-driving turbine and power turbine being connected in flow series to said combustion equipment to receive combustion products therefrom and being capable of rotating independently of one another and coupling means responsive to predetermined values of an engine operating variable which varies with the power output, said coupling means comprising a first driving connection interconnecting said turbines and a second driving connection interconnecting said turbines, said first driving connection comprising a first gear train, a first friction clutch in said first gear train, and a first free-wheel clutch in said first gear train in series with said friction clutch, said first free-wheel clutch transmitting a drive only from said compressor-driving turbine to said power turbine, the transmission ratio of said first gear train being selected so that the free-wheel clutch begins to transmit a drive at a ratio of the rotational speed of the power turbine to that of the compressor-driving turbine corresponding to a first predetermined value of said engine operating variable, and said second driving connection comprising a second gear train having a transmission ratio which is greater than said first speed ratio, a second friction clutch in said second gear train, and a second free-wheel clutch in said second gear train in series with said second friction clutch, said second free-wheel clutch transmitting a drive only from said compressor-driving turbine to said power turbine, means responsive to a second predetermined value of said engine operating variable which is less than said first predetermined value and operative to disengage the first friction clutch when the value of the operating variable falls below said second predetermined value, and means responsive to a third predetermined value of said engine operating variable which is less than said second predetermined value and operative to disengage the second friction clutch when the value of the operating variable falls below said third value.

11. A gas-turbine engine as claimed in claim 10, wherein the means to disengage the first friction clutch comprises a first pressure-responsive device connected to be responsive to the delivery pressure of said air compressor and operative on sensing a compressor delivery pressure corresponding to said second predetermined value of the operating variable to cause said first friction clutch to be disengaged, and the means to disengage the second friction clutch comprises a second pressure-responsive device responsive to a value of said compressor delivery pressure corresponding to the third predetermined value of the operating variable at which said friction clutch in said second gear train is to be disengaged.

References Cited in the file of this patent
UNITED STATES PATENTS

| | | |
|---|---|---|
| 2,445,973 | Sawyer | July 27, 1948 |
| 2,591,540 | Grylls | Apr. 1, 1952 |
| 2,619,797 | Haworth | Dec. 2, 1952 |
| 2,645,412 | Sens | July 14, 1953 |
| 2,660,033 | Bowden et al. | Nov. 24, 1953 |